(12) United States Patent
Zhang et al.

(10) Patent No.: US 9,233,492 B2
(45) Date of Patent: Jan. 12, 2016

(54) COMPOSITE MATERIALS REINFORCED WITH CARBON NANOTUBE YARNS

(75) Inventors: Mei Zhang, Tallahassee, FL (US); Hang Zhang, Tallahassee, FL (US); Ben Wang, Tallahassee, FL (US); Richard Liang, Tallahassee, FL (US); Chuck Zhang, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 756 days.

(21) Appl. No.: 13/271,947

(22) Filed: Oct. 12, 2011

(65) Prior Publication Data

US 2012/0085970 A1 Apr. 12, 2012

Related U.S. Application Data (60) Provisional application No. 61/392,251, filed on Oct. 12, 2010.

(51) Int. Cl.

| | |
|---|---|
| B29C 45/00 | (2006.01) |
| C03C 14/00 | (2006.01) |
| C04B 35/52 | (2006.01) |
| B82Y 30/00 | (2011.01) |
| B29C 70/10 | (2006.01) |
| C04B 35/80 | (2006.01) |
| H01B 1/24 | (2006.01) |
| D02G 3/02 | (2006.01) |
| D02G 3/44 | (2006.01) |
| B29K 105/16 | (2006.01) |

(52) U.S. Cl.
CPC ............ B29C 45/0005 (2013.01); B29C 70/10 (2013.01); B82Y 30/00 (2013.01); C03C 14/002 (2013.01); C04B 35/80 (2013.01); B29K 2105/167 (2013.01); B29K 2995/0026 (2013.01); C03C 2214/06 (2013.01); C04B 2235/5288 (2013.01); D02G 3/02 (2013.01); D02G 3/441 (2013.01); H01B 1/24 (2013.01)

(58) Field of Classification Search
None
See application file for complete search history.

(56) References Cited

U.S. PATENT DOCUMENTS

| | | | |
|---|---|---|---|
| 2008/0170982 A1* | 7/2008 | Zhang et al. | 423/447.3 |
| 2009/0208708 A1* | 8/2009 | Wei et al. | 428/174 |
| 2009/0282802 A1* | 11/2009 | Cooper et al. | 57/238 |
| 2010/0047514 A1* | 2/2010 | Hung | 428/114 |
| 2010/0330365 A1* | 12/2010 | Hassel et al. | 428/367 |

FOREIGN PATENT DOCUMENTS

| | | | | |
|---|---|---|---|---|
| WO | WO 2008085634 A1 * | 7/2008 | | D01F 9/12 |
| WO | WO 2009109485 A1 * | 9/2009 | | D02G 3/44 |

OTHER PUBLICATIONS

Shim et al. Multiparameter Structural Optimization of Single-Walled Carbon Nanotube Composites. American Chemical Society. 2009, 1711-1722.*

Kim et al., 2008, "Improvement of Tensile Properties of Poly(Methyl Methacrylate) by Dispersing Multi-Walled Carbon Nanotubes Functionalized with Poly(3-Hexylthiophene)-Graft-Poly(Methyl Methacrylate)," Composites Science and Technology, 68(9):2120-2124.

Jia et al., 1999, "Study on Poly(Methyl Methacrylate)/Carbon Nanotube Composites," Materials Science and Engineering: A, 271(1-2):395-400.

Jin et al., 2001, "Dynamic Mechanical Behavior of Melt-Processed Multi-Walled Carbon Nanotube/Poly(Methyl Methacrylate) Composites," Chemical Physics Letters, 337(1-3):43-47.

Lee et al., 2005, "The Mechanical Properties of MWNT/PMMA Nanocomposites Fabricated by Modified Injection Molding," Composite Structures, 76(4):406-410.

Liu et al., 2007, "A Comparison of the Mechanical Strength and Stiffness of MWNT-PMMA and MWNT-Epoxy Nanocomposites," Composite Interfaces, 14(4):285-297.

Stephan et al., 2000, "Characterization of Singlewalled Carbon Nanotubes-PMMA Composites," Synthetic Metals, 108(2):139-149.

\* cited by examiner

*Primary Examiner* — Tanisha Diggs
(74) *Attorney, Agent, or Firm* — Sutherland Asbill & Brennan LLP (57) ABSTRACT

Composite materials are provided that include one or more CNT yarns embedded in a matrix material. The composite materials may be transparent. Methods for making the composite materials are also provided. The composite materials may be made by arranging at least one CNT yarn into a desired pattern and embedding the at least one CNT yarn into a matrix material.

14 Claims, 7 Drawing Sheets

COMPOSITE MATERIALS REINFORCED WITH CARBON NANOTUBE YARNS

CROSS-REFERENCE TO RELATED APPLICATION

This application claims priority to U.S. Provisional Application No. 61/392,251, filed Oct. 12, 2010, which is incorporated herein by reference.

STATEMENT REGARDING FEDERALLY SPONSORED RESEARCH OR DEVELOPMENT

This invention was made with government support under grant number FA4819-08-C-0009 awarded by the Airbase Technologies Division (RXQ) of the Air Force Research Laboratory. The government has certain rights to this invention.

FIELD OF THE INVENTION

This disclosure generally relates to composite materials comprising carbon nanotubes (CNTs).

BACKGROUND

CNTs are cylindrical molecules of carbon atoms, wherein the carbon atoms are arranged in a hexagonal lattice. High-quality CNTs are several times stronger than steel piano wire, despite the fact that piano wire is roughly four times as dense. CNTs are also at least five times more thermally conductive than copper, and have very high electrical conductivity and current-carrying capacity.

As a result, CNTs belong to a class of nanomaterials that have remarkable physical and mechanical properties. Their superlative mechanical properties make them a desirable filler material for composite reinforcement. Attempts have been made to disperse CNTs into a polymer matrix as a filler, thereby reinforcing the polymer. To apply the superior properties of CNTs to composites, it is sometimes desirable to disperse CNTs in matrix materials uniformly, and increase the coherence at the interfaces of CNTs and matrix materials.

When using CNTs to reinforce poly(methyl methacrylate) (PMMA), several dispersion methods such as melt blending (Z. Jin, et al. CHEMICAL PHYSICS LETTERS, 337, 43-47 (2001)), in-situ polymerization (Z. Jia, et al. MATERIALS SCIENCE AND ENGINEERING, A271, 395-400 (1999)), solution mixing (solvent evaporation) (C. Stéphan, et al., SYNTHETIC METALS, 108, 139-149 (2000); and K. H. Kim, et al. COMPOSITES SCIENCE AND TECHNOLOGY 68, 2120-2124 (2008)), and mold injection (W. J. Lee, et al. COMPOSITE STRUCTURES, 76, 406-410 (2006)) have been proposed. While these methods show some improvement in the mechanical properties of the composite material, the reinforcement effect of the CNTs is relatively small. Furthermore, the composite materials produced by these methods generally are not transparent. In some instances, the composite materials produced by these methods is black.

At least in certain instances, these properties are due to the difficulties associated with one or more of the following: uniformly dispersing a high concentration of CNTs in matrix materials (especially when long CNTs are used), aligning CNTs in a composite, and the weak interactions between CNTs and a matrix material. Furthermore, the dispersion methods described in the prior art typically cause the resulting composite materials to lose transparency when transparent materials are used as the matrix material. This problem occurs—in some instances—even when the content of CNTs is less than 1 wt %.

Methods are needed that allow CNTs to be used as filler in a composite material that reduces or avoids one or more of these difficulties.

BRIEF SUMMARY

In one aspect, a composite material is provided that comprises a matrix material and at least one CNT yarn, wherein the at least one CNT yarn is embedded in the matrix material. In one embodiment, the at least one CNT yarn is a filler material. In certain embodiments, the composite material is transparent.

In another aspect, methods are provided for making a composite material comprising the following steps: arranging at least one CNT yarn into a desired pattern, and embedding the CNT yarn into a matrix material.

BRIEF DESCRIPTION OF THE DRAWINGS

FIG. 1a is an optical image of a CNT yarn which is twist spun from a CNT forest, FIG. 1b is an SEM image of a twist spun CNT yarn, and FIG. 1c is an SEM image of a liquid-densified CNT yarn.

FIG. 3a depicts an optical image showing 85φ13 µm yarns formed in an array and embedded in poly(methyl methacrylate) PMMA matrix (CNT content: 4.7 wt %). The size of the hot-pressed sample was 3 cm in diameter. The markings were located beneath and visible through the PMMA/CNT-yarn composite. FIGS. 3b and 3c depict optical images of PMMA/CNT-yarn composites with the CNT content of 2.1 wt % and 19 wt %, respectively.

FIG. 6a depicts the transmittance UV-Vis spectra of neat PMMA sheet and PMMA/CNT-yarn composites and FIG. 6b the transmittance of the composites at 550 nm. The composite has higher than 40% transparency even when it contains 20 wt % CNTs. The larger dots in the graph show the data for neat PMMA sheet.

FIG. 7a depicts typical engineering tensile stress-strain curves of PMMA sheet and PMMA/CNT-yarn composite. FIGS. 7b, 7c, and 7d show the effects of CNT content on modulus, strength, and strain of PMMA/CNT-yarn composite, respectively. The larger dots in the graphs show the data for neat PMMA sheet.

FIG. 8a is an optical image and FIGS. 8b and 8c are SEM images that show the broken ends of PMMA/CNT-yarn composite after the tensile test. The horizontal lines in (c) indicate the boundary of the sample cross-section and the circular objects are the CNT yarns in PMMA matrix.

DETAILED DESCRIPTION OF THE INVENTION

Generally, the composite materials described herein contain CNT yarns that reinforce matrix materials.

CNT Yarns

The term "CNT yarn," as used herein, refers to a plurality of CNTs arranged to form a high aspect ratio structure. In one embodiment, the CNT yarns described herein are roughly cylindrical. In another embodiment, the CNTs within the yarn are substantially parallel, in a local sense, to neighboring CNTs.

In embodiments, the CNTs yarns are formed from a plurality of CNTs that includes single-wall carbon nanotubes (SWNTs), multi-walled carbon nanotubes (MWNTs), carbon nanofibers (CNFs), or a combination thereof. In some embodiments, the CNTs are longer than about 100 µm. In other embodiments, the CNTs have a length of about 300 µm to about 500 µm. In further embodiments, the diameters of the CNTs are less than about 30 nm. In certain embodiments, the CNTs have a diameter of about 5 nm to about 15 nm. In one embodiment, the CNTs have a diameter of about 10 nm.

The CNT yarns described herein may be made using any techniques known in the art. The CNT yarns may be made using solid-state or wet processes. Typically, the wet processes involve dispersing CNTs in a solution, and spinning the CNTs into a yarn (or fiber). Conversely, the solid-state processes involve assembling CNTs into yarn (or fiber) without solution.

Figure 1:
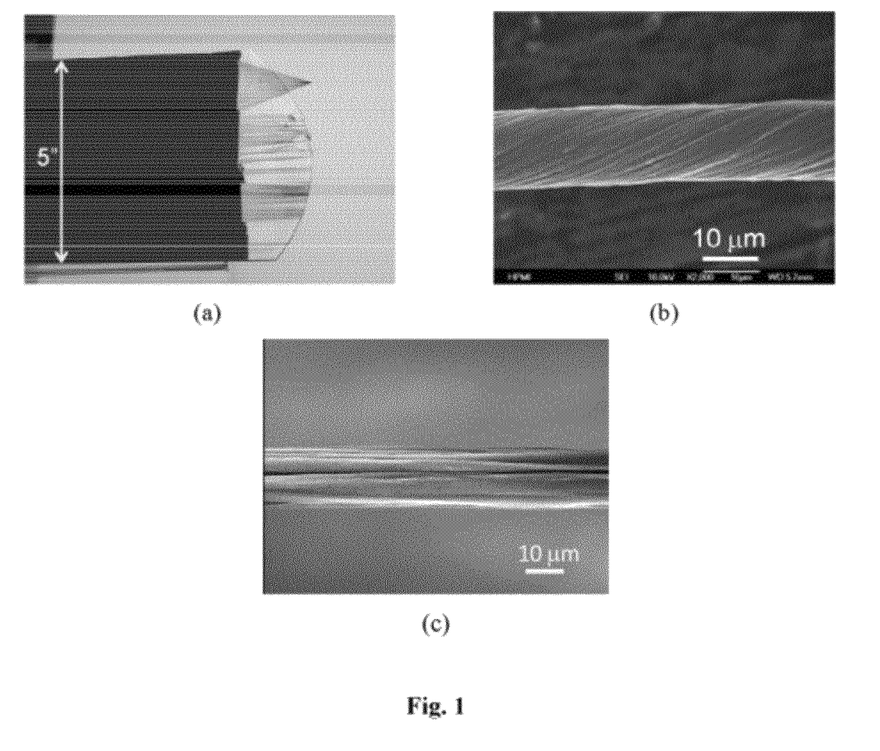
FIG. 1 depicts CNT yarns.

The CNT yarns illustrated in FIGS. 1a and 1b were twist spun from a CNT forest. CNT forest results from an assembly of nanotubes through chemical vapor deposition (CVD). The CNTs in the forest (also called array) are aligned perpendicularly to the substrate surface. FIG. 1a is a photograph of a CNT forest on a Si wafer and a yarn which is twist spun from the CNT forest, and FIG. 1b is a typical SEM image of the twist spun yarn. The CNT yarn illustrated in FIG. 1c is called liquid densified yarn, which is formed by densifying a CNT ribbon drawn from a CNT forest with solvent. The CNTs in the yarn are aligned in the axis direction of the yarn.

In other embodiments, the CNT yarns are formed by directly collecting CNTs from the CVD reactor with or without twist. For twist spun yarn, the twist angle in certain embodiments is from about 5° to about 60°.

In some embodiments, a single CNT yarn may have different diameters, ranging from sub-micrometer to tens of micrometers. In embodiments, the average diameter of the at least one CNT yarn is from about 5 µm to about 25 µm. In further embodiments, the average diameter of the at least one CNT yarn is from about 10 µm to about 20 µm. In still further embodiments, the average diameter of the at least one CNT yarn is about 15 µm.

In some embodiments, the CNT yarn may be fabricated into two-fold, four-fold, or even higher fold yarns. In certain embodiments, several yarns may be bundled together, with or without twist, to form a rope (or cable). In other embodiments, several yarns may be braided together to form a braided yarn.

In embodiments, the CNT yarns or CNT ropes, or a mixture thereof, may be arranged into a woven or nonwoven fabric. in some embodiments, the distances between neighboring CNT yarns are less than about 5 µm. In certain embodiments, the distances between the neighboring CNT yarns are less than about 1 µm. In other embodiments, the distances between neighboring CNT yarns are larger than about 5 µm, so that visible light may pass through the fabric.

In certain embodiments, chemical bonding may be created between adjacent carbon nanotubes. As used herein, chemical bonding refers to any bond, connection, or attractive force between one or more atoms or molecules. Examples of chemical bonding include, but are not limited to, covalent bonds, ionic bonds, metallic bonds, van der Waals forces, and hydrogen bonding.

In other embodiments, forming bonds between adjacent CNTs improves the performance of the resulting yarn, rope, or fabric. In some embodiments, the CNT yarns, ropes, or fabrics may be further infiltrated with polymer or resin. In some embodiments, the CNT yarns may be functionalized. In certain embodiments, the functionalization of the CNT yarn may create better interconnections with polymer molecules, such as, for example, the polymer molecules of a matrix material.

In some embodiments, CNT yarns in composite materials also provide high electrical and thermal conductivities for various applications.

Matrix Materials

Generally, any suitable matrix material known in the art may be used according to the present invention. In certain embodiments, the matrix material may be natural, synthetic, or a combination of natural and synthetic materials. In some embodiments, the matrix materials may be a polymeric material, ceramic material, metal, or a combination thereof. In one embodiment, the polymeric material is a thermoplastic.

In some embodiments, the matrix materials are not transparent to visible light. In other embodiments, the matrix materials are transparent to visible light. As used herein, "transparent" materials are those having greater than 10% average transmittance in the visible region of the electromagnetic spectrum.

Examples of acceptable matrix materials include, but are not limited to, the following: polycarbonate (PC), poly(methyl methacrylate) (PMMA), polyethylene terephthalate (PET), polybutylene terephthalate (PBT), poly(vinyl alcohol) (PVA), epoxy resin, and glasses. A preferred matrix material comprises or consists of a polymer, a co-polymer, or blend of polymer or co-polymers.

Composite Materials

Generally, composite materials are provided that comprise a matrix material and at least one CNT yarn, wherein the at least one CNT yarn is embedded in the matrix material. As used herein, a CNT yarn is "embedded" in the matrix material when the CNT yarn is at least partially enveloped by at least a portion of the matrix material.

In some embodiments, the CNT yarn content in the composite material is from about 0.1 wt % to about 80 wt %. In one embodiment, the CNT yarn content in the composite material is from about 50 wt % to about 80 wt %. In another embodiment, the CNT yarn content in the composite material is from about 60 wt % to about 80 wt %. In a further embodiment, the CNT yarn content in the composite material is from about 70 wt % to about 80 wt %. In a still further embodiment, the CNT yarn content in the composite material is from about 0.1 wt % to about 30 wt %. In yet another embodiment, the CNT yarn content in the composite material is from about 10 wt % to about 30 wt %. In certain embodiments, the CNT yarn content in the composite material is from about 15 wt % to about 25 wt %.

In embodiments, the composite material is transparent. In some embodiments, the minimum distance between the neighboring yarns is over 5 µm. In some embodiments, the minimum distance between the neighboring yarns is over 7 µm. In other embodiments, the minimum distance between the neighboring yarns is over 10 µm.

In embodiments, the composite material has greater than 10% average transmittance in the visible region of the electromagnetic spectrum. In some embodiments, the composite material has greater than 20% average transmittance in the visible region of the electromagnetic spectrum. In further embodiments, the composite material has greater than 30% average transmittance in the visible region of the electromagnetic spectrum. In still further embodiments, the composite material has greater than 40% average transmittance in the visible region of the electromagnetic spectrum. In other embodiments, the composite material has greater than 50% average transmittance in the visible region of the electromagnetic spectrum. In certain embodiments, the composite material has greater than 60% average transmittance in the visible region of the electromagnetic spectrum. In particular embodiments, the composite material has greater than 70% average transmittance in the visible region of the electromagnetic spectrum. In other particular embodiments, the composite material has greater than 80% average transmittance in the visible region of the electromagnetic spectrum. In other certain embodiments, the composite material has greater than 90% average transmittance in the visible region of the electromagnetic spectrum.

In certain embodiments, the composite materials described herein have a tensile strength that is at least two times the tensile strength of the matrix material. In other embodiments, the composite materials described herein have a tensile strength that is at least two and a half times the tensile strength of the matrix material. In further embodiments, the composite materials described herein have a tensile strength that is at least three times the tensile strength of the matrix material.

In certain embodiments, the composite materials described herein have a tensile modulus that is at least two times the tensile modulus of the matrix material. In other embodiments, the composite materials described herein have a tensile modulus that is at least two and a half times the tensile modulus of the matrix material. In further embodiments, the composite materials described herein have a tensile modulus that is at least three times the tensile modulus of the matrix material.

Methods for Making the Composite Materials

Generally, the composite materials may be made by arranging at least one CNT yarn into a desired pattern, and embedding the at least one CNT yarn into a matrix material. In one embodiment, the composite materials described herein are fabricated by hot-press. In another embodiment, the composite materials described herein are fabricated by mold injection.

Typically, a hot press process begins by arranging one or more CNT yarns on the surface of a matrix material. In embodiments, the matrix material is in the form of a sheet. In some embodiments, the CNT yarns are arranged with an angle $\alpha$ ($0°<\alpha<180°$) into an array on the surface of the matrix material. In one embodiment, the CNT yarns are arranged on the surface of the matrix material before the matrix material is placed in a mold. In other embodiments, the CNT yarns may be arranged on the surface of a matrix material already placed in a mold. In certain embodiments, the yarn may be arranged in a parallel, crossed, or other particular pattern. In particular embodiments, the yarns are used to make a woven or nonwoven fabric, which is then arranged on the surface of the matrix material.

In embodiments, the yarns are embedded in the matrix material by applying pressure, such as curtain pressure, and/or increasing the temperature of the mold. In certain embodiments, one or more of these steps is achieved by transferring the mold including the one or more CNT yarns and matrix material to a hot press apparatus. Such hot press apparatuses are known in the art. In one embodiment, the CNT yarns are embedded in the matrix material by applying pressure. In another embodiment, the CNT yarns are embedded in the matrix material by increasing the temperature. In a further embodiment, the CNT yarns are embedded in the matrix material by increasing the temperature and then applying pressure.

In certain embodiments, the temperature is increased to at least about the melting point of the matrix material. When the matrix material is a thermoplastic, the temperature, for instance, may be increased to the setting temperature, which may be below the material's melting point. In other embodiments, the pressure applied by the hot press is at least one metric ton. In further embodiments, the pressure may be applied for at least 2 minutes.

In embodiments, the composite material is allowed to cool, under pressure, until the temperature is less than the glass transition temperature of the matrix material. Once the temperature is below the glass transition temperature, the pressure may be removed. In some embodiments, the composite material is allowed to cool to room temperature after the pressured has been removed.

Generally, the CNT yarns in mold injection processes may be arranged in a mold before the matrix material, in liquid state, is injected into the mold and cured to embed the CNT yarns in the matrix material. In certain embodiments, the yarn may be arranged in a parallel, crossed, or other particular pattern. In particular embodiments, the yarns are used to make a fabric, which is then placed in the mold before introduction of the matrix material.

In certain embodiments of the methods described herein, the matrix material at least partially infiltrates the CNT yarns. Not wishing to be bound by any particular theory, it is believed that the partial infiltration of the matrix material into CNT yarns increases the formation of cross-links inside the CNT yarns. These cross-links may prevent the CNT yarns from sliding when loads are applied to the composite materials.

In particular embodiments, the surfaces of the CNT yarns may be designed to enhance adhesion between the CNT yarns and the matrix material. The enhanced adhesion may reduce slippage between the CNT yarns and the matrix material. In one embodiment, the surface roughness of the CNT yarns is increased. In another embodiment, the CNTs within the CNT yarns are arranged in a way that reduces slippage.

In one embodiment, a plurality of the composite materials described herein may be stacked together to form a higher level laminated composite. This higher level laminated composite may be formed by a hot press process.

EXAMPLES

The following specific examples are provided for illustration and should not be considered limiting on the scope of the invention.

Example 1

Fabricating Polymer/CNT-Yarn Composite Materials

In this particular example, poly(methyl methacrylate) (PMMA) was used as the matrix material. PMMA is a transparent thermoplastic, which is often used as a light or shatter-resistant alternative to glass. The CNTs used for making CNT yarns in this example were multi-walled carbon nanotubes with a ~10 nm diameter, and a length of 300-500 μm. The CNT yarns had a diameter of about 15 μm.

The PMMA/CNT-yarn composite materials in this example were made by applying CNT yarns on top of a PMMA sheet, before placing the materials into a mold and then a hot press apparatus. The materials were heated, without applying pressure, until the plates reached the setting temperature. The setting temperature is usually the melting point of the plastic.

Then, 1 metric ton of pressure was applied for several minutes. The hot press was then shut off to cool down, under pressure, until the temperature was less than the glass transition temperature of the plastic. The pressure was then released completely from the mold, except for the pressure exerted by the weight of the upper aluminum plate. The materials were allowed to cool down to the room temperature.

Figure 2:
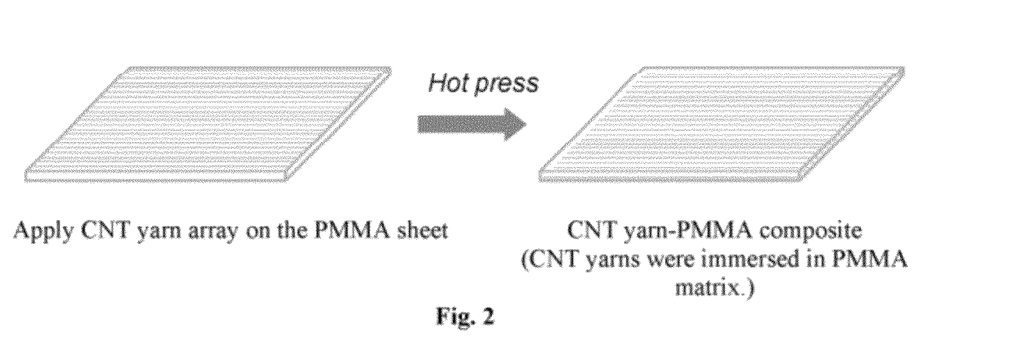
FIG. 2 is a schematic illustration of a process to fabricate one embodiment of a polymer/CNT-yarn composite.

In the resulting composite material, the CNT yarns were embedded into the PMMA matrix through the hot-press process. FIG. 2 is a schematic illustration of the process.

Figure 3:
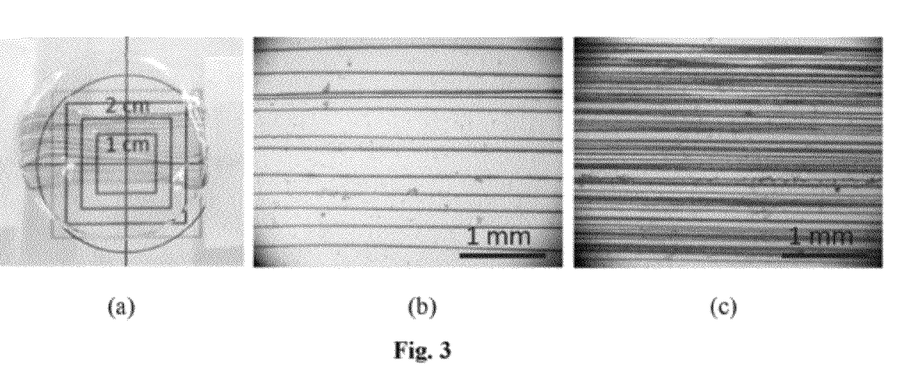
FIG. 3 depicts several composite materials.

For these compositions, the CNTs dispersed uniformly into the PMMA matrix, as evidenced by the optical micrographs and SEM images. FIG. 3 offers photographs of the samples. The optical image in FIG. 3a shows that 85ϕ13 μm CNT yarns formed an array, and were embedded in the PMMA matrix (CNT content: 4.7 wt %). The size of the hot-pressed sample was 3 cm in diameter. The marks were beneath the PMMA/CNT-yarn composite. The optical images in FIGS. 3b and 3c were the PMMA/CNT-yarn composites with a CNT content of 2.1 wt % and 19 wt %, respectively. The CNT yarn array and pattern were embedded in the PMMA matrix. In these examples, the uniform distribution and straightness of the CNT yarns in PMMA matrix was maintained.

The density of the neat PMMA sheet was 1.18 g/cm$^3$, and the density of the pristine CNT yarn was about 0.8 g/cm$^3$. As the CNT content increased, the density of the composite material decreased slightly. The composite material with 17 wt % CNTs had a density of ~1 g/cm$^3$.

Example 2

CNT Yarns

The engineering stress-strain behavior of PMMA sheet and CNT yarns was tested. The tensile strength and strain of the PMMA sheet was ~40 MPa and 2.7%, respectively. The pristine CNT yarn was about 10 times stronger and had a strain that was 3.5 times longer than that of the PMMA sheet. This suggested that CNT yarn may be used to reinforce a PMMA matrix. When a pristine yarn was embedded in the melting PMMA and then pulled out, a PMMA infiltrated CNT yarn was obtained. Through this process, PMMA was at least partially infiltrated into the CNT yarn, and formed a PMMA-coated CNT yarn after cooling down.

Figure 4:
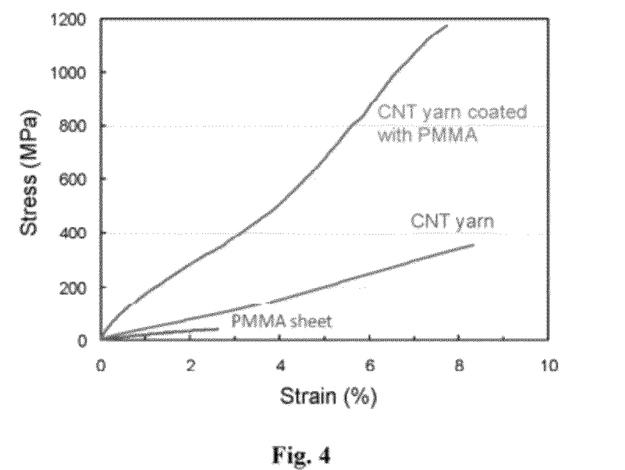
FIG. 4 is a graph which depicts tensile stress-strain curves of a PMMA sheet and a CNT yarn and a CNT yarn infiltrated with PMMA.

FIG. 4 shows that the mechanical properties of the yarn were enhanced. This was because the PMMA infiltration helped the formation of cross-links inside the yarn to prevent the sliding between CNTs under loading. When the CNT yarns were embedded into PMMA matrix, the PMMA infiltrated into CNT yarns, at least on the skin of yarns. This means that CNT yarns as filler in PMMA matrix have similar strength as the PMMA infiltrated CNT yarn. It is estimated that the strength of the yarn inside PMMA matrix could be even higher since the CNTs in the yarn would be further densely packed due to the high pressure during the hot press process.

Example 3

CNT Content Control and Evaluation

Figure 5:
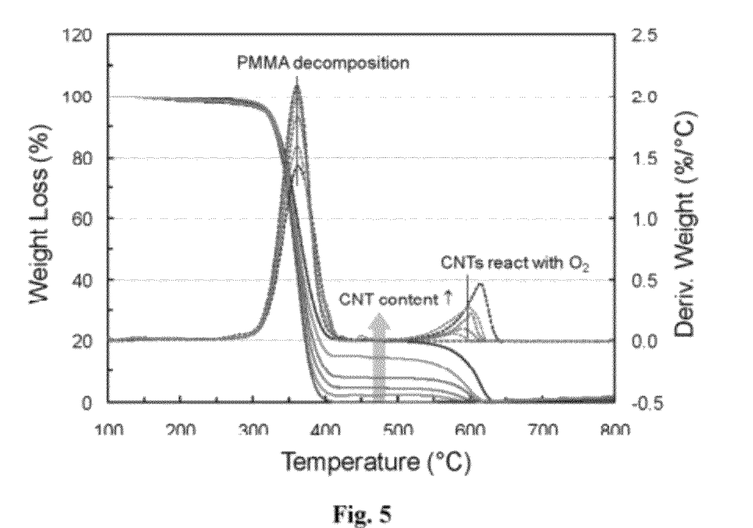
FIG. 5 is a graph which depicts thermogravimetric analysis (TGA) results of PMMA/CNT-yarn composites. The CNT content in the composite is obtained from the weight percent at about 500° C. (solid lines). Derivation weight curves give the decomposition temperature of the materials (dashed lines).

CNT content in the composite materials disclosed herein was controlled by the size and the number of the CNT yarns (namely the area density of the CNT yarn array). Thermogravimetric analysis (TGA) was performed to assess the thermal stability of PMMA and PMMA/CNT-yarn composites, and the weight percentage of CNTs in the composites. TGA was conducted on PMMA and PMMA/CNT composites in nitrogen from 25° C. to 450° C., and then in air from 450° C. to 800° C. at a heating rate of 10° C./min. The gas flow rate was 60 mL/min. The TGA curves are shown in FIG. 5.

From the TGA curves it can be seen that the samples' weight loss could be divided into two parts. The first weight loss stage was attributed to the loss of PMMA, and the second one to the loss of CNTs. The CNT content in the composite was obtained from the weight loss at around 500° C. The decomposition temperatures of PMMA and CNTs in composites were determined by reading the peak position from the derivation weight curves (solid lines in FIG. 5). Derivation weight data (dash lines in FIG. 5) showed that all these composites had acomparable PMMA decomposition temperature of 361° C. as neat PMMA sheet, which indicated that CNTs did not affect PMMA decomposition in nitrogen.

Example 4

Transparency of the Composite

Figure 6:
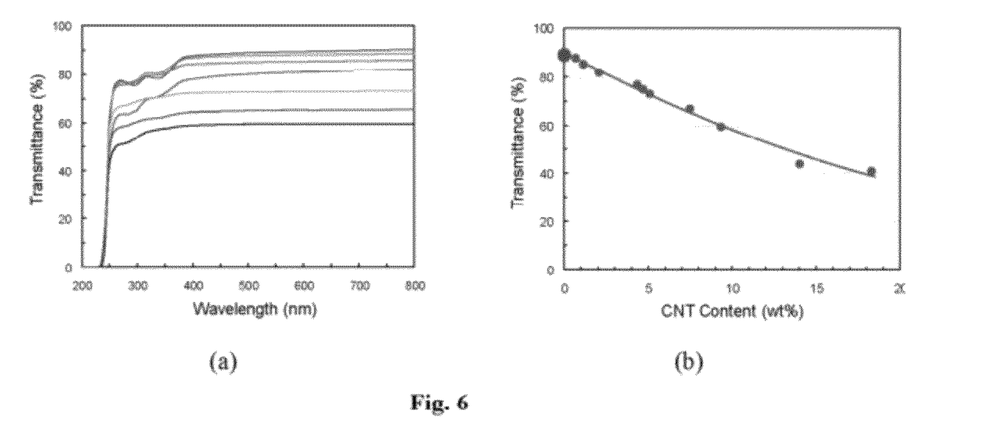
FIG. 6 are graphs which depict optical properties of PMMA/CNT-yarn composites.

The UV-Vis spectra provided quantitative information concerning the transparency of the film, the presence of the CNTs, and the uniformity of the CNT distribution. FIG. 6a shows that the UV-Vis spectra of the composite films with CNT content from 0 to 19 wt % exhibited a transmittance of 40% and higher in the range of 400 nm to 800 nm. The percentage of transmittances of the composites with different CNT contents at 550 nm is shown in FIG. 6b. The transmittance of the composite had an almost linear relationship with the CNT content.

Example 5

Mechanical Properties of the Transparent Composite

Figure 7:
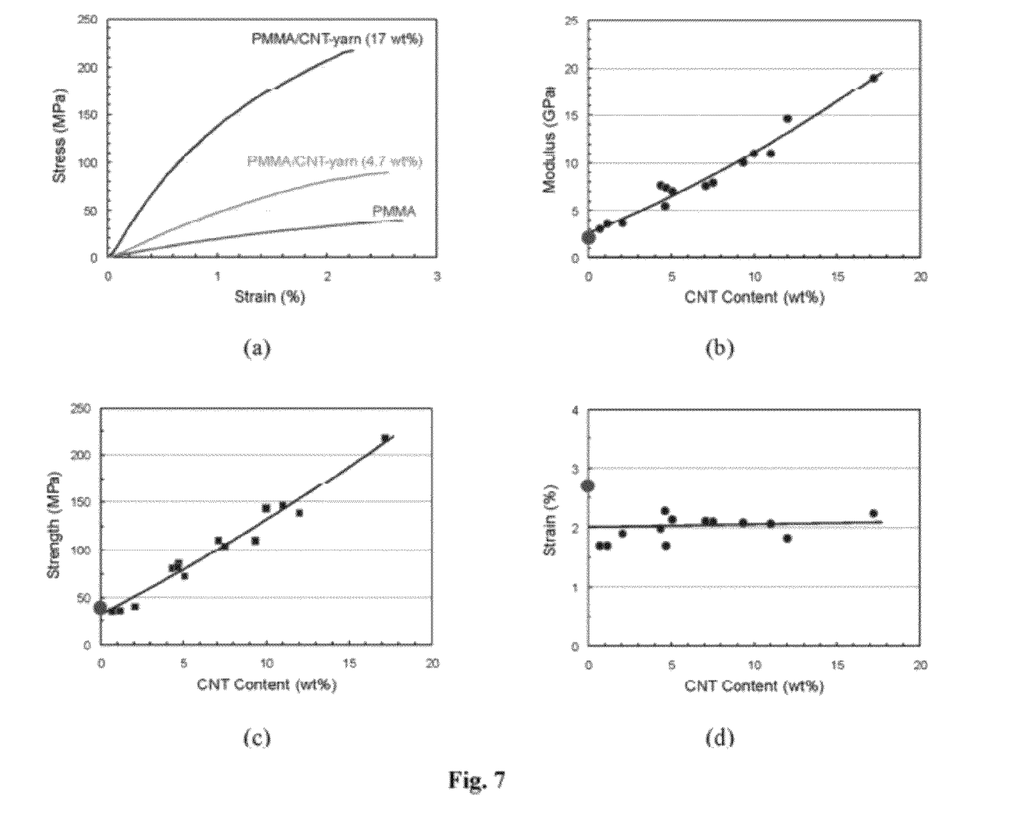
FIG. 7 are graphs which depict the mechanical properties of PMMA/CNT-yarn composites.

To examine the influence of nanotubes on deformation and fracture behavior of the polymer films, a dynamic mechanical analysis (DMA) was operated under controlled force mode to obtain static stress-strain curves (1 N/min, 25° C.). FIG. 7a shows the typical engineering stress-strain behavior of PMMA sheet and PMMA/CNT-yarn composite under constant loading rate. The PMMA/CNT-yarn composites showed dramatic increases in tensile strength and modulus that correlated with the increase of CNT content. The change of the modulus, strength, and strain of the composite with the CNT content is shown in FIGS. 7b-7c.

Compared to unreinforced PMMA sheets, the increase of CNT content resulted in the increase of the modulus of the composite (FIG. 7b). FIG. 7c shows that, in addition to the increase in elastic modulus, the increase of the CNT content also led to a significant increase of the strength of the composite. Both the tensile modulus and the tensile strength increased linearly with increased nanotube loading; the tensile modulus and tensile strength increased by a factor of 10 and 5, respectively at 17 wt % CNT content, while the strain remained nearly constant (FIG. 7d). While not wishing to be bound by any theory, this may have been due to the fact that the CNTs in the composite were highly organized, and the CNTs were oriented close to the loading direction.

While not wishing to be bound by any particular theory, it appeared that increases in elastic modulus and ultimately strength indicated that nanotubes were acting as reinforcement in the polymer matrix by directly transferring load from nanotube to nanotube and from the polymer to the nanotubes. In addition, the aligned nanotubes resulted in improved ultimate strengths, which indicated that there is load transfer between the polymer matrix and the nanotube reinforcement.

Figure 8:
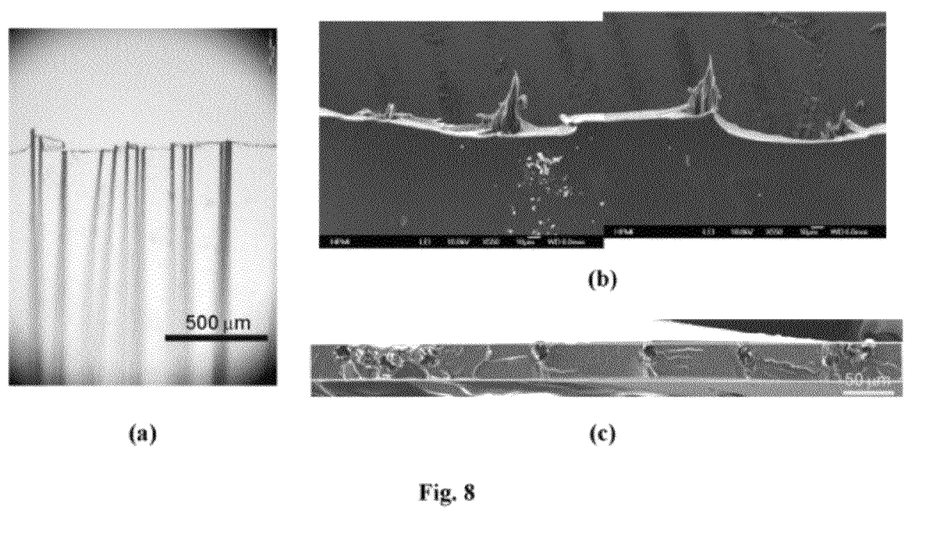
FIG. 8 depicts optical images of several composite materials.

The reinforcement and the rupture behavior of carbon nanotubes-polymer were studied. FIGS. 8a-8c show the fracture patterns of the composite after the tensile test. FIG. 8c shows the cross-section of the composite. CNT yarns were embedded inside the PMMA matrix. FIG. 8b is the SEM image of the fracture end with ~45° view. The presence of fractured yarns, along with the matrix still adhered to the fractured yarns and nanotubes, indicated good wetting and adhesion of the nanotube yarns and the matrix materal. The surface roughness of the CNT yarn (FIG. 1b) enhanced the adhesion and prevented the slip between the CNT yarn and the PMMA matrix. The rupture behavior of the composite film under tension, including crazing of polymer matrix, breakage of CNT yarns (nanotubes), and pullout of carbon nanotubes, was observed. These suggested that carbon nanotubes may reinforce the polymer fibers by hindering crazing extension, reducing stress concentration, and dissipating energy by pullout (FIG. 8). Distribution of CNT yarns in the polymer matrix and interfacial adhesion between nanotubes and polymers appeared to be two major factors that determined the reinforcement effect of carbon nanotubes in polymer films.

We found that the PMMA/CNT composites with 10 wt % CNT yarns showed an increase of 250% and 500% in tensile strength and modulus respectively with little reduction in elongation. When the CNT content increased to 17 wt %, the composite had a 5 fold increase in strength and 10 fold increase in modulus. The toughness of the composite was also improved as the CNT content was increased. The toughness of the composite with 17 wt % CNT content was 11 J/g, which was 8 times higher than that of a neat PMMA sheet. Moreover, this approach also maintained over 40% transparency of the composite material. The CNT-yarn array effectively enhanced the mechanical properties of the PMMA matrix.

Other objects, features, and advantages of the invention will be apparent from the detailed description, drawings, and claims. Unless otherwise defined, all technical and scientific terms and abbreviations used herein have the same meaning as commonly understood by one of ordinary skill in the art to which this invention pertains. Although methods and compositions similar or equivalent to those described herein can be used in the practice of the present invention, suitable methods and compositions are described without intending that any such methods and compositions limit the invention herein.

We claim:

1. A composite material comprising:
   a transparent matrix material in the form of a sheet, and
   two or more carbon nanotube (CNT) yarns embedded in the matrix material,
   wherein the two or more CNT yarns are arranged in a cross pattern in the sheet of the matrix material, and
   wherein the composite material has a transmittance which is greater than 40% in the visible region of the electromagnetic spectrum.

2. The composite material of claim 1, wherein the two or more CNT yarns comprises at least a two-fold yarn.

3. The composite material of claim 1, wherein the two or more CNT yarns are bundled together.

4. The composite material of claim 3, wherein the two or more CNT yarns comprise a rope or cable.

5. The composite material of claim 3, wherein the two or more CNT yarns are not twisted together.

6. The composite material of claim 1, wherein the two or more CNT yarns are a woven fabric.

7. The composite material of claim 6, wherein the distances between individual CNT yarns in the woven fabric allow visible light to pass through the fabric.

8. The composite material of claim 1, wherein carbon nanotubes in each of the two or more CNT yarns are bonded together by chemical bonds.

9. The composite material of claim 1, wherein the matrix material comprises a polymeric material.

10. The composite material of claim 9, wherein the polymeric material comprises polycarbonate, poly(methylmethacrylate), polyethylene terephthalate, polybutylene terephthalate, poly(vinyl alcohol), epoxy resin, glass, or a combination thereof.

11. The composite material of claim 1, wherein the content of CNT yarn in the composite material is from about 0.1 wt % to about 30 wt %.

12. A composite material comprising:
   a transparent thermoplastic polymeric matrix material in the form of a sheet; and
   two or more carbon nanotube (CNT) yarns embedded in the sheet of the matrix material and arranged in a cross pattern therein,
   wherein the composite material has a transmittance which is greater than 40% in the visible region of the electromagnetic spectrum.

13. The composite material of claim 12, wherein the composite material has a CNT yarn content which is from 10 wt % to 30 wt %.

14. A composite material comprising:
   a transparent matrix material in the form of a sheet; and
   a woven or non-woven fabric, comprising two or more carbon nanotube (CNT) yarns, which is embedded in the sheet of the matrix material, and the content of the CNT yarn in the composite material is from 10 wt % to 30 wt %,
   wherein the matrix material is partially infiltrated into CNT yarns and forms cross-links inside the CNT yarns, and
   wherein the composite material has an average transmittance which is greater than 10% in the visible region of the electromagnetic spectrum.

* * * * *